Nov. 27, 1934.  R. A. KYLE  1,982,006
AUTOMATIC AND MANUALLY CONTROLLED CAM AND LEVER ACTUATED DISK CLUTCH
Filed Feb. 28, 1933  4 Sheets-Sheet 1
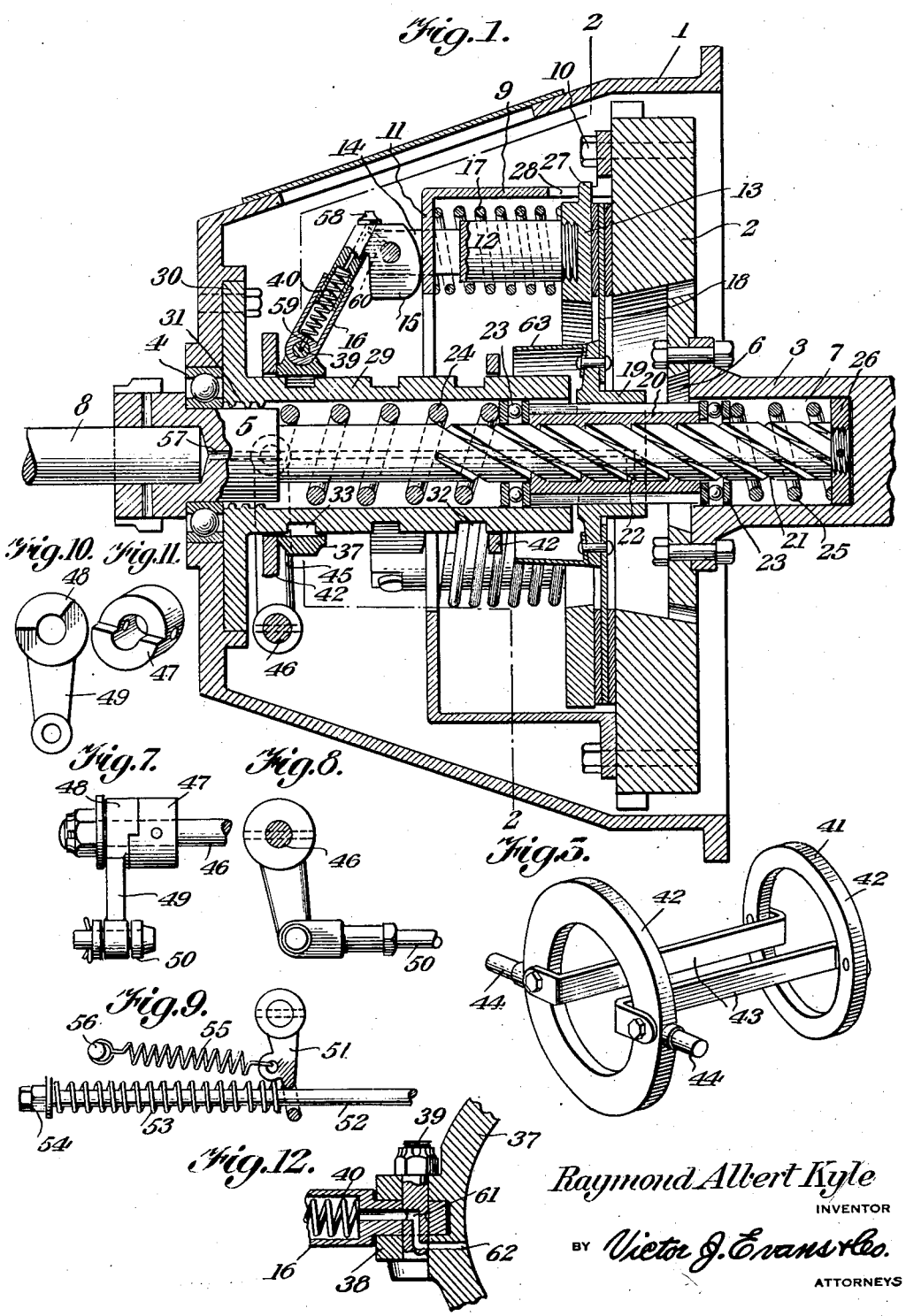
Raymond Albert Kyle
INVENTOR Nov. 27, 1934.　　　　R. A. KYLE　　　　1,982,006
AUTOMATIC AND MANUALLY CONTROLLED CAM AND LEVER ACTUATED DISK CLUTCH
Filed Feb. 28, 1933　　　4 Sheets-Sheet 2
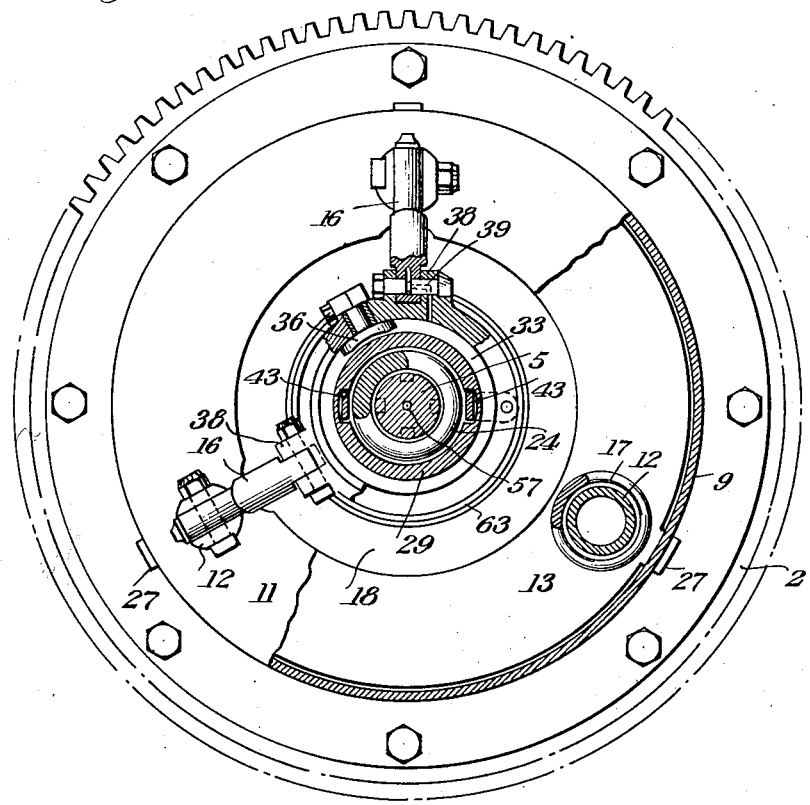
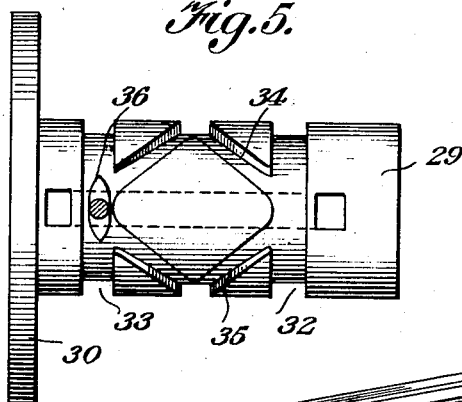
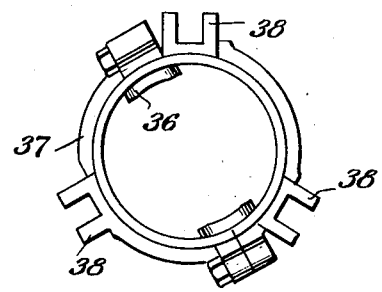
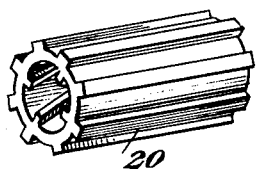
Raymond Albert Kyle
INVENTOR
BY Victor J. Evans & Co.
ATTORNEYS Nov. 27, 1934.   R. A. KYLE   1,982,006
AUTOMATIC AND MANUALLY CONTROLLED CAM AND LEVER ACTUATED DISK CLUTCH
Filed Feb. 28, 1933   4 Sheets-Sheet 3
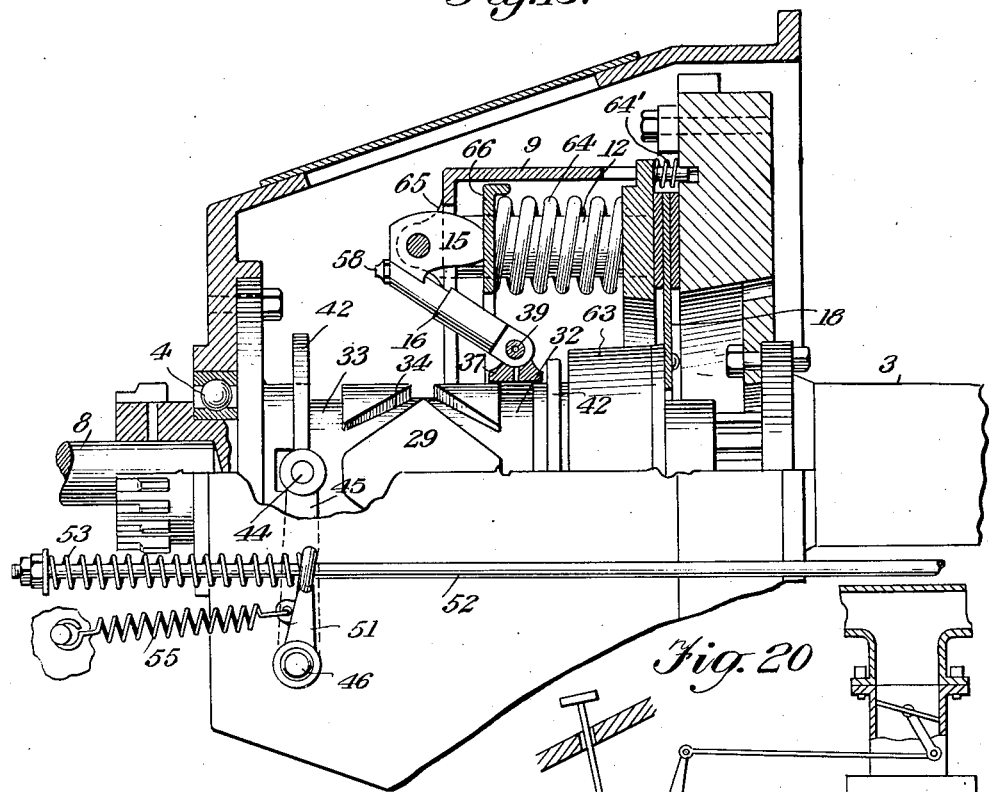
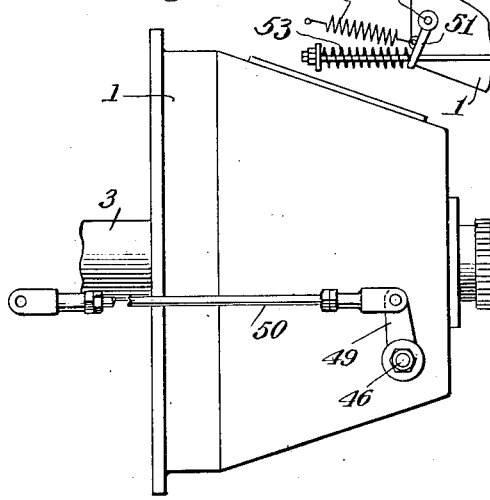
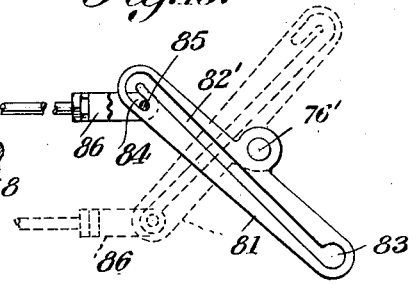
Raymond Albert Kyle
INVENTOR
BY Victor J. Evans & Co.
ATTORNEYS Nov. 27, 1934.  R. A. KYLE  1,982,006
AUTOMATIC AND MANUALLY CONTROLLED CAM AND LEVER ACTUATED DISK CLUTCH
Filed Feb. 28, 1933  4 Sheets-Sheet 4
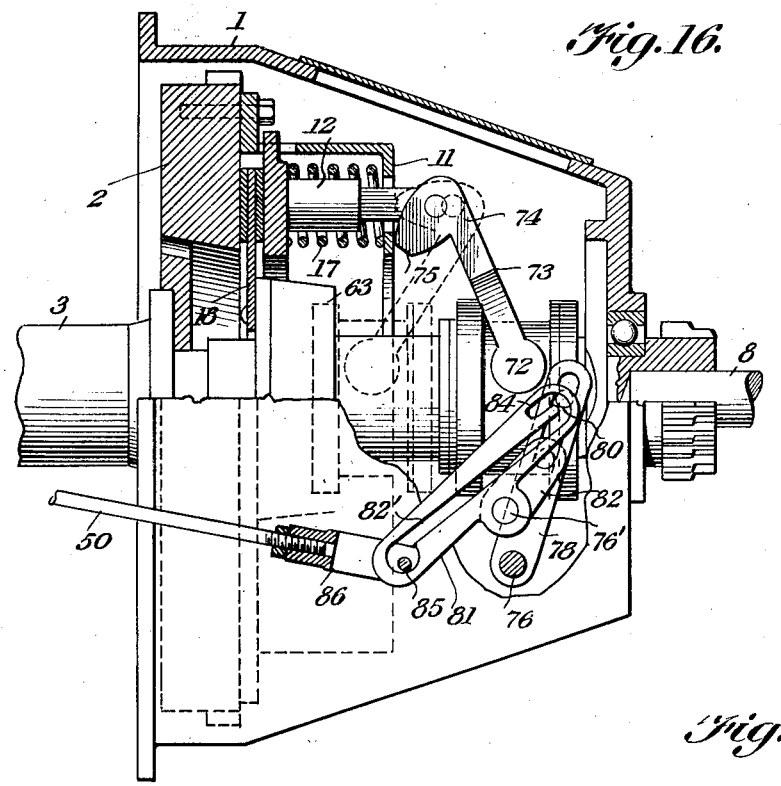
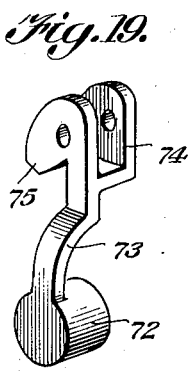
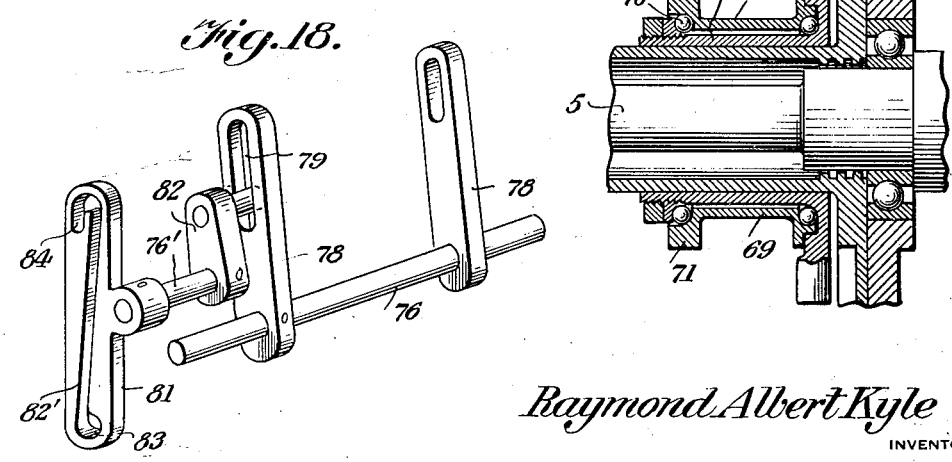
Raymond Albert Kyle
INVENTOR
BY Victor J. Evans & Co.
ATTORNEYS Patented Nov. 27, 1934

1,982,006

UNITED STATES PATENT OFFICE 1,982,006

AUTOMATIC AND MANUALLY CONTROLLED CAM AND LEVER ACTUATED DISK CLUTCH

Raymond Albert Kyle, Breese, Ill.

Application February 28, 1933, Serial No. 658,990

10 Claims. (Cl. 192—.01)

This invention relates to automatic clutches especially adapted for motor vehicles and has for the primary object, the provision of a device of the above stated character which may be manually operated by the usual clutch controlled pedal or automatically actuated by the accelerator of the motor vehicle so that during the operation of the engine at idling speed, the clutch is automatically disengaged and engaged when the speed of the engine increases over idling speed, providing a device which reduces manual effort of gear shifting in starting and stopping of the motor vehicle to a minimum.

Another object of this invention is the provision of a cushioning means to prevent sudden starting of the driven shaft by the engine during the engaging of the clutch either automatically or manually.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an automatic clutch constructed in accordance with my invention and showing the clutch occupying an engaged position.

Figure 2 is a transverse sectional view taken on the line 2—2 of Figure 1.

Figure 3 is a perspective view illustrating a shifting element.

Figure 4 is a plan view illustrating a clutch control collar.

Figure 5 is a plan view illustrating a feed sleeve for effecting movement of the clutch control collar.

Figure 6 is a perspective view illustrating a sleeve or boxing forming a part of the cushion means.

Figure 7 is a detail view of a clutch connection between the operating shaft of the clutch and the clutch control pedal.

Figure 8 is a detail view partly in section illustrating the same.

Figure 9 is a detail view partly in section illustrating the connection between the clutch operating shaft and the accelerator of the motor vehicle.

Figure 10 is an end view illustrating one of the elements of the clutch between the clutch operating shaft and the clutch control pedal.

Figure 11 is a perspective view illustrating the other element of the clutch referred to in the description of Figure 10.

Figure 12 is a detail sectional view illustrating the connection between a clutch operating arm and the clutch control collar.

Figure 13 is a side elevation partly in section illustrating a modified form of clutch.

Figure 14 is a side elevation illustrating the connection between the clutch operating shaft and the clutch control pedal.

Figure 15 is a detail view illustrating a part of another modified form of my invention.

Figure 16 is a vertical sectional view illustrating a manually operated clutch employing the part shown in Fig. 15.

Figure 17 is a sectional view, illustrating a clutch collar employed in the form of clutch shown in Fig. 16.

Figure 18 is a perspective view illustrating a clutch operating shaft employed in the clutch shown in Figure 16.

Figure 19 is a perspective view, illustrating a clutch operating arm employed in the clutch shown in Figure 16.

Figure 20 is a detail sectional view illustrating a conventional type of accelerator with a part of my invention connected thereto.

Referring in detail to the drawings, the numeral 1 indicates a clutch housing of a conventional design to receive in its forward end a fly wheel 2 mounted on the crank shaft 3 of an engine. The rear wall of the clutch housing 1 is apertured to receive a pilot bearing 4 supporting the rear end of a clutch shaft 5, the forward end of which extends through an opening 6 in the fly wheel and into a socket 7 formed in the crank shaft. The rear end of the clutch shaft 5 enters the usual transmission of a motor vehicle and is constructed in the form of a conventional type of high gear of the transmission and is socketed to pilot one end of the drive shaft 8 of the transmission. The fly wheel 2 has one face thereof constructed to form a bearing surface for a clutch plate and the fly wheel carries upon said face a mounting 9, the latter being secured to the fly wheel by fasteners 10. The mounting 9 is of cylindrical formation and is provided at one end with an inwardly extending flange 11 apertured to slidably receive clutch pins 12 threaded to a pressure plate 13 located adjacent the clutch face of the fly wheel. The clutch pins 12 have their other ends formed to provide clevises 14 to which are pivoted cams 15 formed integrally with clutch operating arms 16. Mounted on the clutch pins 12 are coil springs 17 bearing against the flange 11 and the pressure plate 13 and are always maintained under pressure by the cams. The action of the springs is to normally urge the pressure plate 13 towards the fly wheel to cause a binding of a clutch plate 18 between said pressure plate and the fly wheel. The clutch plate 18 is carried by a hub 19 splined to a sleeve 20 mounted on the clutch shaft 5, the latter having feed grooves 21 to receive ribs 22 on the sleeve. Thrust bearings 23 are arranged at the ends of the sleeve 20 on the clutch shaft and one of the thrust bearings is engaged by a coil spring 24 mounted on the shaft 5 and in engagement with a shoulder formed on the shaft, while the other thrust bearing engages a coil spring 25 on the clutch shaft and bearing against a thrust washer 26 threaded to the forward end of the clutch shaft and also keyed to said clutch shaft. The hub 19, sleeve 20 and springs 24 and 25 form a yieldable drive between the clutch plate 18 and the clutch shaft for the purpose of absorbing sudden starting of the clutch shaft by the clutch plate when the latter is brought into engagement with the fly wheel.

The pressure plate is provided with projections 27 operating in slots 28 in the mounting 9 for the purpose of preventing rotation of the pressure plate relative to the mounting but which will permit the pressure plate to slide relative to the mounting and towards and from the fly wheel. The active faces of the cams 15 operate against the flange 11 of the mounting 9. The cams are actuated by the clutch arms moving endwise of the clutch shaft 5 to engage and disengage the clutch.

A cylinder 29 has a flange 30 at one end suitably secured to the rear wall of the clutch housing 1 and the cylinder surrounds a portion of the clutch shaft 5 and encloses the spring 24 and one of the thrust bearings 23 with the sleeve 20 extending into one end thereof. Lubricant retaining ribs 31 are formed on the cylinder 29 adjacent the pilot bearing 4 to prevent lubrication from the usual transmission from entering the interior of the clutch housing 1 about the clutch shaft 5. Spaced annular grooves 32 and 33 are formed in the cylinder and are connected by oppositely extending feed grooves 34 and 35. Operating within said grooves are dogs 36 carried by a clutch control collar 37 and the latter is constructed of detachable sections and has formed thereon spaced ears 38 to which the clutch operating arms 16 are pivoted by bolts 39. The clutch operating arms 16 are constructed of telescoping sections, as shown in Figure 1, with coil springs 40 interposed between said sections to permit the arms to shorten and lengthen, depending upon the movement of the clutch control collar from one annular groove of the cylinder 29 to the other annular groove of said cylinder.

A shifter 41 is mounted on the cylinder 29 for a limited sliding movement and consists of spaced rings 42 located adjacent the annular grooves 33 and 32 and are connected by tie bars 43 for movement in unison. The tie bars 43 operate in grooves formed on the inner wall of the cylinder 29 and also through slots formed in said cylinder. One of the rings carries oppositely arranged pintles 44 to which forks 45 are journaled and the latter are formed integrally with a clutch operating shaft 46 journaled in bearings carried by the side walls of the clutch housing 1. One end of the shaft 46 carries a clutch element 47 cooperating with a clutch element 48 journaled on the shaft 46 and formed integral with an arm 49, having pivoted thereto a connecting rod 50. The rod 50 is in turn connected to the usual clutch control pedal of a motor vehicle. The opposite end of the shaft 46 has secured thereto an arm 51 apertured to slidably receive an accelerator rod 52 forming part of the usual accelerator of the motor vehicle, as clearly shown in Figure 20. A coil spring 53 is mounted on the accelerator rod 52 between the arm 51 and adjusting nuts 54 carried by the accelerator rod. A coil spring 55 has one end attached to the arm 51 and the other end suitably anchored, as shown at 56. The spring 55 functions to rock the shaft 46 in one direction to cause disengagement of the clutch while the arm 51 is adapted to be rocked in an opposite direction to cause an engagement of the clutch by movement of the accelerator rod 52 to increase the speed of the engine over idling speed. When the clutch is operated by the accelerator the usual clutch pedal of the motor vehicle is not affected due to the clutch elements 48 and 47. However, it is possible to operate the clutch by the clutch pedal by pressing down on the latter in the usual manner.

When the clutch is disengaged the clutch control collar occupies a position in the annular groove 32 of the cylinder 29 and when the clutch is engaged the clutch control collar occupies a position in the annular grove 33 as shown in Figure 1. To automatically control the clutch by the accelerator, the clutch control collar 37 occupies the annular groove 32 when the engine is running at idling speed, causing the clutch operating arms 16 to assume a position for disengaging the pressure plate from the clutch plate 18, interrupting the drive between the fly wheel and the clutch shaft 5. As the accelerator is depressed to increase the speed of the engine it rocks the shaft 46 through the arm 51 against the action of the spring 55. The rocking of the shaft 46 slides the shifter 41, causing one of the rings 42 thereof to engage the clutch control collar 37 and place a pressure thereon so that the dogs enter the feed groves and cause the clutch control collar to move into the annular groove 33, positioning the cams 15 so that the pressure plate acts on the clutch plate 18 and wedges the latter against the fly wheel, thereby engaging the clutch. As soon as the engine operates at idling speed, the spring 55 rocks the clutch shaft 46 in an opposite direction, causing the shifter 41 to slide and place pressure on the clutch control collar so that the dogs will enter the other feed grooves and advance the clutch control collar into the annular groove 32 again disengaging the clutch.

The clutch shaft 5 is drilled to form a lubricant passage 57 for the purpose of conveying lubricant from the transmission to the interior of the boxing or sleeve 20 and the lubricant feeding out of the sleeve 20 will supply the thrust bearings 23. The transmission shaft 8 being piloted in the clutch shaft usually has a slight endwise movement which will have a tendency for urging lubricant through the lubricant passage 57.

The clutch operating arms 16 are provided with lubricant fittings 58 so that lubricant may be forced into said arms and which are provided with passages 59 and 60. The passages 60 feed lubricant to the pivots of the cams, while the passages 59 feed lubricant to the bolts which connect said arms to the clutch control collar and these bolts have lubricant passages 61 communicative with passages 62 in the clutch control collar for lubricating the latter on the cylinder 29 and also the dogs 36 operating within the grooves of the cylinder. A shield 63 is carried by the hub 19 of the clutch plate 18 and surrounds the open end of the cylinder 29 to prevent lubricant which may escape therefrom from coming in contact with the clutch plate 18, the fly wheel being chambered and apertured so that lubricant caught by the fly wheel will be directed away from the clutch plate and escape through the apertures of the fly wheel.

Referring to my modified form of invention, as shown in Figure 13, this construction is very similar to the form shown in Figure 1, except for the fact that the clutch springs 64 act to normally permit the pressure plate to free the clutch plate from the fly wheel depending on the cams to compress the springs 64 to cause the pressure plate to force the clutch plate in engagement with the fly wheel and thereby engage the clutch. The cams in this form of invention are pivoted to ears 65 carried by the mounting 9 and operate against a follower or annular plate 66 apertured to receive the clutch pins 12, the plate 66 bearing against the springs 64. In this form of the invention the clutch control collar when engaging the clutch occupies the annular groove 32 of the cylinder 29 and occupies the annular groove 33 when disengaging the clutch, which action is reverse to the form of invention shown in Figure 1. Also in the modified form of the invention the arms 49 and 51 are reversed on the clutch operating shaft 46, that is they extend upwardly instead of downwardly as in the form shown in Figure 1. In the form shown in Figure 1 the springs 17 normally engage the clutch and are contracted to disengage the clutch while in the form of my invention shown in Figure 13, the springs 64 are permitted to expand to disengage the clutch and are contracted to cause engagement of the clutch, being exactly reverse in the operation from the form of invention shown in Figure 1. Springs 64' are provided to move the pressure plate away from the clutch disk during the expansion of the springs 64.

Referring to the form of invention shown in Figures 15 to 19, a means is provided for manually actuating the type of clutch disclosed in Figure 1 wherein the clutch may be locked either in clutch engaging or disengaging position and when locked in clutch disengaging position free wheeling is provided to the vehicle to which the clutch is applied.

A clutch operating collar 67 is slidably mounted on the clutch cylinder and consists of inner and outer sleeves 68 and 69 having interposed therebetween bearings 70 whereby the outer sleeve may rotate free of the inner sleeve. The outer sleeve is equipped with spaced flanges 71 between which operate the enlarged ends 72 of clutch operating arms 73. The other ends of the arms 73 are bifurcated to form spaced ears 74 and cams 75. The ears 74 are pivoted to the clutch pins 12 and the cams 75 act upon the flange 11 of the mounting 9. With the arms 73 occupying the dotted line position shown in Figure 16, the clutch is disengaged. A clutch operating shaft 76 is journaled in the clutch housing and has secured thereto spaced arms 78 having slots 79 to receive pintles 80 of the clutch collar 67. A shaft 76' is journaled to the clutch housing and has a crank arm 82 fitting in the slot 79 of one of the arms 78 and the outer end of the shaft 76' has secured thereto an arm 81 provided with a slot 82' extending substantially the full length thereof and having one end terminating into a lateral branch 83 and the other end formed in hook-shape, as shown at 84. A clevis pin 85 operates in the slot 82' and is carried by a clevis 86 connected in the usual manner to a clutch operating pedal or medium. To disengage the clutch the clutch pedal 80 is depressed, moving the lower end of the arm 81 shown in Figure 16 to the right causing the shaft 76 to be rocked to slide the clutch collar 67 to the left, positioning the clutch arms in dotted line position. The cams 75 of said clutch arms then bear against the flange 11 of the mounting 9, causing the pressure plate to move away from the clutch disk. Upon movement of the arm 81 in the direction described and the return of the clutch pedal to normal position, the clevis pin moves along the slot 82' into the hook-shaped end thereof, permitting the clutch to remain disengaged. To again engage the clutch the clutch pedal is depressed and due to the hook-shaped end 84 the arm 81 is compelled to assume the position shown in Figure 16 and on the return of the clutch pedal to normal position, the clevis pin moves out of the hook-shaped end 84 and along the slot 82' into the lateral branch 83. The clutch is then locked in engaged position.

While I have shown and described the preferred embodiment of my invention, it will be understood that minor changes in construction, combination and arrangement of parts may be made without departing from the spirit and scope of my invention, as claimed.

Having described the invention, I claim:

1. In combination with a clutch housing and the fly wheel of an engine having a clutch face and an accelerator, a clutch shaft journaled in said housing and having a feed groove, a boxing slidable on the shaft and having threads to mesh with the feed groove, thrust bearings engaging the ends of the boxing, cushion means between the shaft and the thrust bearings, a clutch plate splined to the boxing, a pressure plate for acting on the clutch plate, and means actuated either manually or automatically by the accelerator of the engine to engage and disengage the clutch plate with the clutch face of the fly wheel.

2. In combination with a clutch housing and the fly wheel of an engine having a clutch face and an accelerator, a clutch shaft journaled in said housing, a boxing slidable on said shaft and having a driving connection with the latter, thrust bearings on the shaft engaging the ends of the boxing, cushion springs engaging the thrust bearings, means on the shaft forming seats for the springs, a hub splined to the boxing, a clutch plate carried by the hub, a pressure plate for acting on the clutch plate, and means actuated manually or automatically by the accelerator of the engine to engage and disengage the clutch plate with the clutch face of the fly wheel.

3. In combination with a clutch housing and fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, means on said collar to engage the grooves, an operating means between the collar and the pressure plate, and control means to act on the collar for causing the latter to move from one annular groove to the other annular groove and in either direction of the cylinder to cause the pressure plate to engage and disengage the clutch plate with the clutch face of the fly wheel.

4. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, means on said collar to engage the groove, operating means between the collar and the pressure plate, a shifter on the cylinder to act on the collar, and means for effecting movement of the shifter.

5. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, dogs connected to the collar and operating in the grooves, operating means between the collar and the pressure plate, rings on the collar adjacent the annular groove to engage the collar, bars connecting said rings, and an operating means connected to one of the rings.

6. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, means on said collar to engage the grooves, a shifter on the cylinder to engage the collar, an operating means for the shifter, a mounting on the fly wheel, pins on the pressure plate and slidable through the mounting, tension means for the pressure plate, and means between the collar and the pins for operating the pressure plate.

7. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves, connected by oppositely arranged feed grooves, a clutch control collar slidable on the cylinder, means on said collar to engage the grooves, a shifter on the cylinder to engage the collar, an operating means for the shifter, a mounting on the fly wheel, pins on the pressure plate and slidable through the mounting, tension means for the pressure plate, cams pivoted to the pins to act on the mounting, and arms between the cams and collar.

8. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, means on said collar to engage the grooves, a shifter on the cylinder to engage the collar, an operating means for the shifter, a mounting on the fly wheel, pins on the pressure plate and slidable through the mounting, tension means for the pressure plate, cams pivoted to the pins to act on the mounting, and yieldable arms between the cams and the collar.

9. In combination with a clutch housing and a fly wheel of an engine having a clutch face, a clutch shaft journaled in the housing, a clutch plate connected to the shaft, a pressure plate to act on the clutch plate, a cylinder supported by the clutch housing and having spaced annular grooves connected by oppositely arranged feed grooves, a clutch control collar slidable on the cylinder, means on said collar to engage the grooves, a shifter on the cylinder to engage the collar, an operating means for the shifter, a mounting on the fly wheel, pins on the pressure plate and slidable through the mounting, tension means for the pressure plate, cams pivoted to the pins to act on the mounting, telescopic arms between the cams and collar, and springs between the sections of the telescopic arms.

10. In combination with a clutch housing and a fly wheel of an engine having a clutch face, a clutch shaft journaled in the housing, a clutch plate connected to the shaft, a pressure plate to act on the clutch plate, a mounting secured to the fly wheel, pins carried by the pressure plate, springs on said pins and bearing against the pressure plate, a follower ring slidable on the pins and engaging the springs, cams pivoted to the mounting and engaging the follower ring, arms on said cams, a control collar connecting the arms and means for operating the control collar.

RAYMOND A. KYLE.